2,955,091

COMPOSITIONS COMPRISING REACTION PRODUCT OF A POLYALKYLENEETHER GLYCOL, A FATTY ACID TRIGLYCERIDE, AND AN ARYLENE DIISOCYANATE AND FOAM PREPARED THEREFROM

Robert P. Kane, Claymont, Del., assignor to E. I. du Pont de Nemours and Company, Wilmington, Del., a corporation of Delaware No Drawing. Filed Aug. 27, 1957, Ser. No. 680,623

6 Claims. (Cl. 260—2.5)

This invention relates to novel polyisocyanate-polyurethane compositions and more particularly to water-foamable polyisocyanate - polyurethane compositions which may be used to form highly useful cellular materials.

The preparation of cellular materials from water-foamable polyisocyanate compositions is well known in the art. Generally, these water-foamable compositions have been prepared by the reaction of an organic polyisocyanate with a polyhydroxy compound such as a polyester glycol, a polyalkyleneether glycol, castor oil, etc. For example, in the preparation of cellular materials for automobile crash pads, the water-foamable polyurethane compositions which have been prepared from a polyester glycol have generally been used. It has been found that cellular materials which have been used for crash pad applications have generally been deficient in one or more respects, such as in the degree of resiliency, load-bearing capacity, hydrolytic stability or freeze resistance. It would be highly desirable to be able to provide a cellular material for automobile crash pads which would be characterized by a proper degree of resiliency, along with a capacity for high impact absorption.

It is an object of this invention to provide a novel polyisocyanate-polyurethane composition. A further object is to provide a water-foamable polyisocyanate-polyurethane composition which may be used to prepare highly useful cellular materials. A still further object is to provide a cellular material which is useful as an automobile crash pad. Other objects will appear hereinafter.

These and other objects of the present invention are accomplished by a water-foamable polyisocyanate-polyurethane composition which is useful in the formation of cellular materials and which is obtained by reacting at a temperature between about 25° and 100° C. (a) a polyalkyleneether glycol having a molecular weight of from about 500 to 1900, with at least 60% by weight of said glycol being 1,2-propyleneether units; (b) a fatty acid triglyceride having a hydroxyl number not less than about 100; and (c) an arylene diisocyanate; the amounts of reactants being selected so that the molar ratio of said glycol to said triglyceride is from about 1:0.5 to 1:1.5, and the ratio of the number of free isocyanate groups to the total number of hydroxyl groups present on said glycol and said triglyceride being from about 1.3:1 to 1.6:1; said reaction being carried out until substantially all of the hydroxyl groups have been reacted with isocyanate groups, followed by the addition of a sufficient amount of an arylene diisocyanate so that said composition contains from about 8 to 14% by weight of free isocyanate groups.

The water-foamable compositions of the present invention may be converted to highly useful cellular materials by reacting them with water, in the presence of a catalyst.

The water-foamable polyisocyanate-polyurethane compositions of the present invention are obtained by reacting a polyalkyleneether glycol, a fatty acid triglyceride, and an arylene diisocyanate in specific molar proportions, and after substantially all of the hydroxyl groups have reacted with the isocyanate groups, additional isocyanate is added in order that the composition have a specific free isocyanate content. It is only by means of using specific molar proportions of reactants and the use of additional diisocyanate so as to yield a specific free isocyanate content, that water-foamable compositions are obtained which can be converted to cellular materials having highly desirable properties.

The polyalkyleneether glycols which are used to prepare the water-foamable compositions of the present invention are compounds which may be represented by the formula $HO(RO)_nH$, wherein R is an alkylene radical of up to about 10 carbon atoms and $n$ is an integer sufficiently large so that the molecular weight of the glycol is from about 500 to about 1900. The alkylene groups represented by R need not necessarily be the same in any given glycol. It is necessary that at least 60% by weight of the glycols which are useful in the present invention be composed of oxy(propylene) units. The remaining portion of the alkyleneether units may be units such as oxy(ethylene), oxy(trimethylene), oxy(tetramethylene), oxy(hexamethylene), oxy(decamethylene), oxy(n-butylethylene), oxy(n-hexylethylene), oxy(cyclohexylethylene), and oxy(n-octylethylene). For purposes of the present invention, it is recommended that these glycols have a water content of not more than about 0.05% by weight. These polyalkyleneether glycols may be conveniently prepared by polymerizing cyclic aliphatic ethers or by condensation of the glycols. Thus, polypropyleneether glycols may be prepared by the polymerization of propylene oxide. Polyalkyleneether glycols wherein all of the alkylene radicals are not the same may be prepared by copolymerizing propylene oxide with other cyclic ethers, such as tetrahydrofuran or ethylene oxide. For purposes of the present invention, polypropyleneether glycol is preferred.

As mentioned above, it is necessary that at least 60% by weight of the polyalkyleneether glycol be composed of oxy(propylene) units. This is necessary so that the resulting foams display good hydrolytic stability. In addition, it is necessary that the molecular weight of the polyalkyleneether glycol range from about 500 to 1900. It has been found that if the molecular weight is less than about 500, the resulting polyurethane composition is unduly viscous and the cellular materials which are obtained will tend to have an undesirably low resilience. On the other hand, if the molecular weight of the polyalkyleneether glycol is in excess of 1900, the cellular materials obtained tend to be too resilient. For purposes of the present invention it is preferred that the glycol have a molecular weight of about 1000.

It is to be understood that other glycols, such as polyalkyleneether-thioether glycols and polyalkylenearyleneether glycols, may be used instead of, or in conjunction with, the polyalkyleneether glycol. Here again it is necessary that at least about 60% by weight of the glycol be composed of oxy(propylene) units.

The fatty acid triglycerides which are used in preparing the compositions of the present invention may be the naturally occurring oils containing the ricinoleic acid glyceride or the blown drying oils commonly referred to in the trade as "heavy bodied" oils, such as blown linseed, tung, poppyseed, hempseed, soya oil, etc. It is recommended that these triglycerides have a water content of not more than about 0.05% by weight. For purposes of the present invention, castor oil is preferred. The hydroxyl number of the fatty acid triglyceride should be from about 100 to 180. The limit of 180 is used since naturally occurring oils with a higher hydroxyl number than 180, which is the value for the pure triglyceride of ricinoleic acid, are not known, and it is difficult to oxidize unsaturated oils to the extent where products are produced having a higher hydroxyl number.

In preparing the water-foamable compositions of the present invention, the proportions of polyalkyleneether glycol to fatty acid triglyceride should be selected so that the molar ratio of glycol to triglyceride ranges from about 1:0.5 to 1:1.5. If the ratio is greater than 1:0.5 the load-carrying capacity of the foams obtained will be undesirably low; if the ratio is less than 1:1.5, the foams obtained will be too stiff. For purposes of the present invention, the preferred ratio is 1:1.

Any of a wide variety of arylene diisocyanates may be used to react with the polyalkyleneether glycol and fatty acid triglyceride. For purposes of the present invention, it is preferred that the arylene diisocyanate contain two isocyanate groups which are of unequal reactivity; however, as much as 30 mol percent of the arylene diisocyanate used may be a diisocyanate having isocyanate groups of equal reactivity. It is to be understood that the arylene diisocyanate may contain substituents which are non-reactive with isocyanate groups and that mixtures of two or more different diisocyanates may be employed. Representative diisocyanates which are useful in preparing the foamable composition of the present invention include toluene-2,4-diisocyanate, cumene-2,4-diisocyanate, 1,5-naphthalene diisocyanate, anisole-2,4-diisocyanate, chlorobenzene-2,4-diisocyanate, 3-methylbenzidine diisocyanate, and 1-[(3-methyl-4-isocyanato)phenoxy]-4-phenylisocyanate. For purposes of this invention, toluene-2,4-diisocyanate or an isomeric mixture of 80% toluene-2,4-diisocyanate and 20% toluene-2,6-diisocyanate is preferred.

As mentioned above, the amount of diisocyanate to be used is dependent upon the amounts of polyalkyleneether glycol and fatty acid triglyceride which are used. For purposes of the present invention, it is necessary that there be a ratio of the number of free isocyanate groups to the total number of hydroxyl groups present on said glycol and triglyceride of from about 1.3:1 to 1.6:1. It is only by means of this specific ratio that a polyisocyanatepolyurethane composition is obtained with a proper degree of chain extension. If the ratio is greater than about 1.6:1 the resulting composition after standardization to 8% to 14% free isocyanate content either collapses when foamed or yields weak cellular products which have poor load strength. On the other hand, if the ratio is less than about 1.3:1, the viscosity of the composition is too great for convenient handling. The composition, prepared from a 1.3:1 to 1.6:1 ratio, after having additional diisocyanate added thereto, yields a highly useful, foamable composition which, when foamed by the reaction with water, produces cellular materials having outstanding properties.

After the arylene diisocyanate has reacted with substantially all of the hydroxyl groups of the polyalkyleneether glycol and the fatty acid triglyceride (ratio of free isocyanate groups to total number of hydroxyl groups being from about 1.3:1 to 1.6:1), the final free isocyanate content of the composition is adjusted to from about 8 to 14% by weight by means of the addition of an arylene diisocyanate. Since all of the hydroxyl groups have reacted with isocyanate groups, there will be no reaction between the composition and this additional arylene diisocyanate. It is to be understood that this additional arylene diisocyanate which is added need not necessarily be the same as the arylene diisocyanate which is used to react with the glycol and triglyceride. Any of the arylene diisocyanates mentioned above may be used.

The final free isocyanate content of from about 8 to 14% by weight of said composition is necessary since it has been determined that when the water-foamable composition has an isocyanate content of less than about 8%, the composition is very viscous and the resulting cellular materials which are obtained are too dense to be economical. On the other hand, with a free isocyanate content of more than about 14%, the resulting cellular materials tend to be too rigid.

In preparing the water-foamable compositions of the present invention, the arylene diisocyanate, fatty acid triglyceride and polyalkyleneether glycol may be reacted at a temperature range from about 25° to 100° C. The reaction time required will, of course, depend on the reaction temperature which is being used. This reaction should be carried out in a dry reaction vessel protected from atmospheric moisture by a slow sweep of dry nitrogen. The progress of the reaction can be followed by withdrawing small samples from the reaction medium and determining their free isocyanate content. When the reaction mixture has a free isocyanate content which indicates that substantially all of the hydroxyl groups have been reacted with isocyanate groups, the additional arylene diisocyanate may be added to adjust the free isocyanate content of the composition to about 8 to 14% by weight. The resulting composition is stable indefinitely in the absence of water.

After the free isocyanate content of the water-foamable composition has been adjusted, this composition may be converted into a cellular material by reacting it with water, in the presence of a tertiary amine catalyst. This reaction with water can be carried out at temperatures ranging from about room temperature to about 70° C. The amount of water used in preparing the foam should be about 80 to 200% of that theoretically required, i.e., one molecule of water for two free isocyanate groups. For purposes of the present invention, from about 100 to 120% of that theoretically required should be used. Representative tertiary amine catalysts which may be used to accelerate the reaction of water with a water-formable composition are N-methyl morpholine, trimethylamine, triethylamine, 3-dimethylaminopropionamide, and diethylethanolamine. Mixtures of tertiary amines may be used also. The amount of catalyst needed will depend on its activity and the temperature at which the foaming operation is conducted. In addition to the use of a tertiary amine catalyst, a silicone compound, such as polydimethyl siloxane, may be employed in order to provide foams of finer and more uniform cell structure. A polydimethyl siloxane having a viscosity of from about 3 to 50 centistokes is satisfactory for this purpose. When preparing the cellular materials, the water and catalyst are added to the water-foamable composition and the mixture obtained is vigorously agitated until foaming begins. The expanding mass is then allowed to rise in place or it may be transferred to a wax-lined mold. The cellular material which is obtained after curing displays a high load-bearing capacity, superior hydrolytic stability and good freeze resistance, and it is particularly useful as an automobile crash pad. Curing of the cellular material may be carried out at various times and temperatures, such as initially curing for two hours at 100° C. at 50% relative humidity, followed by one hour of dry heat at 100° C.

The following examples will better illustrate the nature of the present invention; however, the invention is not intended to be limited to these examples. Parts are by weight unless otherwise indicated.

The measurements on the properties of the cured foams are done in accordance with the following ASTM methods:

Compression set—D395–55, Method B
Yerzley resilience—D945–55
Compression modulus—D575–46, Method B

EXAMPLE 1

A. *Preparation of water-foamable composition*

(1) A dry reaction vessel equipped with a thermometer, nitrogen inlet, agitator and condenser protected by a drying tower filled with calcium chloride is charged with 190 parts of polypropyleneether glycol of molecular weight 1052 and 183 parts of castor oil of molecular weight 1018. A slow sweep of nitrogen is begun and continually maintained throughout the subsequent operations. Agitation is started and 114 parts of a toluene diisocyanate isomer mixture (80% 2,4- and 20% 2,6-isomer) is introduced. A slight evolution of heat occurs. When the temperature has stopped rising, external heat is applied. The reaction mixture is subsequently heated at 60° C. for 22 hours. The ratio of isocyanate groups to hydroxyl groups is 1.44:1. The resulting composition has a free isocyanate content of 3.51% and exhibits a Brookfield viscosity at 30° C. of about 252,000 cps.

(2) An additional 61 parts of the toluene diisocyanate isomer mixture is then charged into the reaction mixture. After the mass has been stirred for a half hour to insure homogeneity, it is discharged from the reaction vessel and collected under nitrogen in dry containers. The composition has a free isocyanate content of 8.25% and displays a Brookfield viscosity at 30° C. of 48,500 c.p.s.

B. *Preparation of cellular material*

(1) 100 parts of the composition of A(2) above is mixed, in turn, with 0.2 part of polydimethylsiloxane (50 centistokes grade), 2.1 parts of water, and 1.0 part of N-methyl morpholine. The mass is vigorously agitated until foaming commences; it is then poured into a wax-lined mold where it subsequently expands. The foam obtained is stripped from the mold and is cured at 100° C. for 2 hours at 50% relative humidity. The properties of the cured cellular material are given in Table I below. The foam is very suitable for use in shock-absorbent applications.

(2) 100 parts of the composition of A(2) above is mixed with 4.7 parts of the toluene diisocyanate isomer mixture. The resulting composition has a free isocyanate content of 10%. This composition is foamed by the procedure given in B(1) except that 2.7 parts of water is employed. The cellular product is cured for 2 hours at 100° C. at 50% relative humidity. It is suitable for shock-absorbent applications. Table I contains its properties.

(3) 100 parts of the composition of A(2) above is mixed with 10.5 parts of the toluene diisocyanate isomer mixture. The resulting composition has a free isocyanate content of 12%. This composition is foamed by the procedure given in B(1) except that 3.4 parts of water is employed. The cellular product obtained is cured by exposure at 100° C. for 2 hours at 50% relative humidity. Table I contains its properties.

TABLE I

|  | Cellular Materials | | |
| --- | --- | --- | --- |
|  | B(1) | B(2) | B(3) |
| Density (lbs./cu. ft.) | 3.8 | 3.1 | 2.8 |
| Compression Set (Percent), 70° C. | 6.5 | 12 | 14 |
| Yerzley Resilience (Percent) | 20 | 21 | 24 |
| Compression Modulus (lbs./sq. in.), 25° C.: | | | |
| at 25% deflection | 1.3 | 1.5 | 1.5 |
| at 50% deflection | 1.8 | 2.2 | 2.3 |

EXAMPLE 2

A. *Preparation of water-foamable composition*

200 parts of polypropyleneether glycol of molecular weight 995, 210 parts of castor oil of molecular weight 1045, and 125 parts of a toluene diisocyanate isomer mixture (80% 2,4- and 20% 2,6-isomer) are agitated under nitrogen at 100° C. for 2.5 hours. The ratio of isocyanate groups to hydroxyl groups is 1.41:1. The composition has a free isocyanate content of 3.23%. It is subsequently diluted with 130 parts of the same toluene diisocyanate isomer mixture to give a composition which has a free isocyanate content of 12.4% and displays a Brookfield viscosity of 18,000 cps. at 30° C.

B. *Preparation of cellular material*

100 parts of the composition prepared above is mixed, in turn, with 0.2 part of polydimethylsiloxane (50 centistokes grade), 3.2 parts of water, and 1.0 part of N-methyl morpholine. The mass is poured into a wax-lined mold where it subsequently expands. The foam obtained is stripped from the mold and is cured at 100° C. for 2 hours at 50% relative humidity. The properties of the cured cellular material are given in Table II below. The foam is very suitable for use in shock-absorbent applications. It has excellent load-bearing capacity at an exceptionally low density.

TABLE II

| | |
| --- | --- |
| Density (lbs./cu. ft.) | 2.3 |
| Compression set (percent), 70° C. | 23 |
| Yerzley resilience (percent) | 15 |
| Compression modulus (lbs./sq. in.), 25° C.: | |
| At 25% deflection | 1.35 |
| At 50% deflection | 2.05 |

EXAMPLE 3

A. *Preparation of water-foamable composition*

98.7 parts of polypropyleneether glycol of molecular weight 987, 101.8 parts of castor oil of molecular weight 1018, and 57.5 parts of toluene-2,4-diisocyanate are agitated under nitrogen for 3.5 hours at 100° C. The ratio of isocyanate groups to hydroxyl groups is 1.3:1. The composition thus obtained has a free isocyanate content of 3.6%. It is subsequently diluted with 67 parts of toluene-2,4-diisocyanate to give a composition which has a free isocyanate content of 12.3% and a Brookfield viscosity of 55,600 cps. at 30° C.

B. *Preparation of cellular material*

100 parts of the composition prepared above is stirred, in turn, with 0.2 part of polydimethylsiloxane, 3.16 parts of water, and 1.0 part of N-methyl morpholine. The mixture is poured into a mold lined with a silicone mold release agent. The mass expands to fill the mold with a low density foam which has a "dead" feel and is satisfactory for use as a crash pad.

EXAMPLE 4

A. *Preparation of water-foamable composition*

96.6 parts of polypropyleneether glycol of molecular weight 1003, 100 parts of castor oil of molecular weight 1018, and 68.1 parts of toluene-2,4-diisocyanate are agitated under nitrogen for 3.75 hours at 80° C. The ratio of isocyanate groups to hydroxyl groups is 1.6:1. The composition thus obtained has a free isocyanate content of 4.8%. It is then diluted with 52.7 parts of toluene-2,4-diisocyanate to give a composition which has a free isocyanate content of 12.2% and exhibits a Brookfield viscosity at 30° C. of 8700 cps.

B. *Preparation of cellular material*

100 parts of the composition prepared above is thoroughly mixed, in turn, with 0.2 part of polydimethylsiloxane (50 centistokes grade), 3.14 parts of water, and 1.0 part of N-methyl morpholine. The mass is poured into a paraffin-lined mold which it subsequently fills with a light cellular product of low resilience which is satisfactory for shock-absorbent applications.

EXAMPLE 5

A. *Preparation of water-foamable composition*

412 parts of polypropyleneether glycol of molecular weight 1028, 204 parts of castor oil of molecular weight 1018, and 174 parts of toluene-2,4-diisocyanate are agitated under nitrogen for 5 hours at 100° C. The ratio of isocyanate groups to hydroxyl groups is 1.43:1. The composition thus obtained has a free isocyanate content of 3.2%. 104 parts of toluene-2,4-diisocyanate is subsequently introduced to give a composition which has a free isocyanate content of 11% and exhibits a Brookfield viscosity of 34,000 cps. at 25° C.

B. Preparation of cellular material 100 parts of the composition prepared above is thoroughly mixed, in turn, with 0.1 part of polydimethylsiloxane (50 centistokes grade), 2.36 parts of water, and 1.0 part of N-methyl morpholine. The well-stirred mass is poured into a wax-lined mold which is transferred to a 70° C. oven. The mass expands to give a foam of low resilience which is suitable for shock-absorbent uses.

C. Preparation of water-foamable composition 411 parts of polypropyleneether glycol of molecular weight 1028, 205 parts of castor oil, and 279 parts of toluene-2,4-diisocyanate are agitated under nitrogen for 4 hours at 80° C. to give a composition which has a free isocyanate content of 8.3% and exhibits a Brookfield viscosity at 25° C. of 17,000 cps. The ratio of isocyanate groups to hydroxyl groups is 2.28:1. This composition is effectively a toluene-2,4-diisocyanate solution of isocyanate-capped polypropyleneether glycol and isocyanate-capped castor oil.

D. Preparation of cellular material 100 parts of the composition prepared in C above is stirred with 0.2 part of polydimethylsiloxane (50 centistokes grade), 2.14 parts of water, and 1.0 part of N-methyl morpholine. The resulting mixture is poured into a wax-lined mold. The foam obtained is very unsatisfactory. It cannot be handled without permanent deformation in less than 24 hours after its formation. Similar results occur when the water-foamable composition of C above is diluted to a 10% free isocyanate content and foamed.

EXAMPLE 6

A. Preparation of water-foamable composition 64.4 parts of polypropyleneether glycol of molecular weight 1003, 100 parts of castor oil of molecular weight 1035, and 56.8 parts of a toluene diisocyanate isomer mixture (80% 2,4- and 20% 2,6-isomer) are agitated under nitrogen for 2 hours at 100° C. The ratio of isocyanate groups to hydroxyl groups is 1.54:1. The composition thus prepared has a free isocyanate content of 4.4%. 48 parts of the toluene diisocyanate isomer mixture is then introduced to give a composition which has a free isocyanate content of 12.2% and exhibits a Brookfield viscosity at 30° C. of 19,900 cps.

B. Preparation of cellular material 100 parts of the composition prepared above is carefully mixed, in turn, with 0.1 part of polydimethylsiloxane (5 centistokes grade), 2.62 parts of water, and 1.0 part of N-methyl morpholine. The foaming mass gives a cellular product which when cured is very suitable for applications involving high impact absorption.

EXAMPLE 7

A. Preparation of water-foamable composition 184 parts of a glycol of molecular weight 1151, containing about 90% by weight 1,2-oxypropylene and about 10% by weight polyoxyethylene units (commercially available from the Wyandotte Chemicals Corp. as "Pluronic" L–31), 166 parts of castor oil of molecular weight 1035, and 99.3 parts of a toluene diisocyanate isomer mixture (80% 2,4- and 20% 2,6-isomer) are agitated under nitrogen for 5 hours at 80° C. The ratio of isocyanate groups to hydroxyl groups is 1.4:1. The composition thus obtained has a free isocyanate content of 3.2%. The composition is diluted with 88 parts of the toluene diisocyanate isomer mixture to give a composition which has a free isocyanate content of 12.1% and a Brookfield viscosity at 30° C. of 13,700 cps.

B. Preparation of cellular material 100 parts of the composition prepared above is mixed with 0.1 part of polydimethylsiloxane (10 centistokes grade), 3.12 parts of water, and 1.0 part of N-methyl morpholine. The mass is then transferred to a paraffin-lined mold where it expands to give a low density foam. The cellular product is then stripped from the mold and cured for 2 hours at 100° C. at 50% relative humidity. The cured material has good shock absorbency.

EXAMPLE 8

A. Preparation of water-foamable composition 367.2 parts of polypropyleneether glycol of molecular weight 1836, 203.6 parts of castor oil of molecular weight 1018, and 123.9 parts of a toluene diisocyanate isomer mixture (80% 2,4- and 20% 2,6-isomer) are agitated under nitrogen for 3 hours at 100° C. The ratio of isocyanate groups to hydroxyl groups is 1.4:1. The composition thus obtained has a free isocyanate content of 2.7%. The composition is diluted with 175.5 parts of the toluene diisocyanate isomer mixture to give a composition which has a free isocyanate content of 11.9% and exhibits a Broofield viscosity of 8700 cps. at 30° C.

B. Preparation of cellular material 100 parts of the composition prepared above is mixed, in turn, with 0.1 part of polydimethylsiloxane (5 centistokes grade), 2.55 parts of water, and 1.0 part of N-methyl morpholine. The mass is then poured into a wax-lined mold in which it expands to give a cellular product suitable for crash pad applications.

EXAMPLE 9

A. Preparation of water-foamable composition 155 parts of polypropyleneether glycol of molecular weight 1033, 154 parts of castor oil of molecular weight 1025, and 164 parts of a toluene diisocyanate isomer mixture (80% 2,4- and 20% 2,6-isomer) are agitated at 80° C. for 3 hours. The ratio of isocyanate groups to hydroxyl groups is 2.6. The composition thus prepared has a free isocyanate content of 9.85% and a Brookfield viscosity at 25° C. of 14,500 cps. This composition is made up essentially of isocyanate-capped polypropyleneether glycol, isocyanate-capped castor oil, and excess toluene diisocyanate.

B. Preparation of cellular material 100 parts of the composition prepared above is mixed with 0.1 part of polydimethylsiloxane (5 centistokes grade), 2.12 parts of water, and 1.0 part of N-methyl morpholine. The foam rises very slowly and subsequently collapses.

When, on the other hand, the polypropyleneether glycol and the castor oil are initially reacted at 80° C. for 3 hours with 98 parts of the toluene diisocyanate isomer mixture (ratio of the number of isocyanate groups to the total number of hydroxyl groups present is 1.5), and the composition obtained is diluted with additional toluene diisocyanate to raise the free isocyanate content to 9.8%, the composition obtained may be foamed to give a cellular product with good shock-absorbent properties.

EXAMPLE 10

A. Preparation of water-foamable composition 20.54 parts of polypropyleneether glycol of molecular weight 1074, 19.7 parts of castor oil of molecular weight 1032, and 11.9 parts of a toluene diisocyanate isomer mixture (80% 2,4- and 20% 2,6-isomer) are agitated under nitrogen for 19.5 hours at 50° C. and 2.5 hours at 80° C. The ratio of the number of isocyanate groups to number of hydroxyl groups is 1.4:1. The composition thus obtained has a free isocyanate content of 3.3%. The composition is diluted with 9.44 parts of the toluene diisocyanate isomer mixture to give a composition which has a free isocyanate content of 9.8% and exhibits a Brookfield viscosity of 29,400 cps. at 30° C.

B. Preparation of cellular material 50 parts of the composition prepared above is mixed with 6.15 parts of the toluene diisocyanate to give a composition which has a free isocyanate content of 14%. This composition is stirred vigorously at room temperature, in turn, with 0.06 part of polydimethylsiloxane (5 centistokes grade), 0.55 part of N-methyl morpholine, 0.12 part of triethylamine, and 1.8 parts of water. The mass is then poured into a wax-lined mold in which it expands to give a cellular product useful for crash pad applications.

EXAMPLE 11

A. Preparation of water-foamable composition 103 parts of poly-1,2-propyleneether glycol, 102 parts of castor oil, and 62 parts of toluene-2,4-diisocyanate are agitated under nitrogen for 3 hours at 100° C. The ratio of the number of isocyanate groups to the number of hydroxyl groups is 1.4:1. The fluid composition thus obtained has a free isocyanate content of 3.64%. The composition is diluted with 50 parts of toluene-2,4-diisocyanate to give a composition which has a free isocyanate content of 10.9%.

B. Preparation of cellular material 83.5 parts of the composition prepared above is mixed at room temperature with 0.083 part of polydimethylsiloxane (3 centistokes grade), 2.43 parts of water, and 0.90 part of N-methyl morpholine. The mass is poured into a paraffin-lined box in which it expands to give a foam characterized by a capacity for high impact absorption.

As many widely different embodiments of this invention may be made without departing from the spirit and scope thereof, it is to be understod that this invention is not limited to the specific embodiments thereof except as defined in the appended claims.

I claim:
1. A water-foamable polyisocyanate-polyurethane composition which is obtained by reacting at a temperature between about 25° and 100° C. (a) a polyalkyleneether glycol having a molecular weight of from about 500 to 1900, with at least 60% by weight of said glycol being 1,2-propyleneether units; (b) a fatty acid triglyceride having a hydroxyl number not less than about 100; and (c) an arylene diisocyanate; the amounts of reactants being selected so that the molar ratio of said glycol to said triglyceride is from about 1:0.5 to 1:1.5, and the ratio of the number of free isocyanate groups to the total number of hydroxyl groups present on said glycol and said triglyceride being from about 1.3:1 to 1.6:1; said reaction being carried out until substantially all of the hydroxyl groups have been reacted with isocyanate groups, followed by the addition of a sufficient amount of an arylene diisocyanate so that said composition contains from about 8 to 14% by weight of free isocyanate groups.

2. A water-foamable polyisocyanate-polyurethane composition according to claim 1 wherein the polyalkyleneether glycol is a polypropyleneether glycol having a molecular weight of about 1000.

3. A water-foamable polyisocyanate-polyurethane composition according to claim 2 wherein the fatty acid triglyceride is castor oil.

4. A water-foamable polyisocyanate-polyurethane composition according to claim 3 wherein the arylene diisocyanate is toluene-2,4-diisocyanate.

5. A water-foamable polyisocyanate-polyurethane composition according to claim 3 wherein the arylene diisocyanate is an isomeric mixture of 80% toluene-2,4-diisocyanate and 20% toluene-2,6-diisocyanate.

6. A cellular material obtained by reacting the water-foamable polyisocyanate polyurethane composition of claim 1 with water in the presence of a tertiary amine catalyst, there being employed from about 0.4 to 1.0 molecule of water for every free isocyanate group in said polyurethane composition.

References Cited in the file of this patent
UNITED STATES PATENTS

| | | |
|---|---|---|
| 2,772,245 | Simon et al. | Nov. 27, 1956 |
| 2,833,730 | Barthel | May 6, 1958 |

OTHER REFERENCES

Cassias et al.: "Princeton University Plastics Laboratory, Castor Oil—M-Tolylene Diisocyanate Polyethane Resins and Related Modification as Potting Compounds," PB–122974, July 25, 1952, pages 21 to 23.

White: "Journal Soc. of Dyers and Colourists," volume 70, No. 11, November 1954, pages 481–486.